United States Patent [19]

Ii et al.

[11] Patent Number: 4,845,574
[45] Date of Patent: Jul. 4, 1989

[54] APPARATUS FOR RECORDING AND REPRODUCING DIGITAL SIGNALS ON MAGNETIC TAPE

[75] Inventors: Hiroshi Ii, Higashihiroshima; Katsubumi Koyanagi; Syuhei Yasuda, both of Nara, all of Japan

[73] Assignee: Sharp Kabushiki Kaisha, Osaka, Japan

[21] Appl. No.: 875,711

[22] Filed: Jun. 18, 1986

[30] Foreign Application Priority Data

Jun. 18, 1985 [JP] Japan ................................ 80-134870

[51] Int. Cl.$^4$ ............................................. G11B 5/09
[52] U.S. Cl. ........................................ 360/51; 360/46; 360/39
[58] Field of Search ...................... 360/46, 51, 67, 39, 360/26; 375/95, 110, 118

[56] References Cited

U.S. PATENT DOCUMENTS

| | | | |
|---|---|---|---|
| 3,895,186 | 7/1975 | Yoshida et al. | 375/118 |
| 4,328,587 | 5/1982 | Mizuno et al. | 375/118 |
| 4,355,284 | 10/1982 | Acker | 375/95 |
| 4,543,531 | 9/1985 | Sugita et al. | 375/110 |
| 4,564,870 | 1/1986 | Kitamura | 360/67 |
| 4,646,173 | 2/1987 | Kammeyer et al. | 360/51 |
| 4,675,885 | 6/1987 | Gagliardi et al. | 375/110 |
| 4,700,241 | 10/1987 | Yasuda et al. | 360/46 |

Primary Examiner—Alan Faber
Assistant Examiner—Surinder Sachar
Attorney, Agent, or Firm—Birch, Stewart, Kolasch & Birch

[57] ABSTRACT

An apparatus for recording and reproducing a digital data signal carrying digital information at each periodically appearing reference "P1" phase includes a detector for detecting and producing a phase data signal at each sampling point. Two subsequently sampled phase data are stored in latches for use of the digital data signal by three signal comparators. The first comparator compares the first sampled phase data signal and the second sampled phase data signal. The second comparator compares the first sampled phase data signal with a predetermined value, and the third comparator compares the second sampled phase data signal with the same predetermined value. Utilizing the outputs of the three comparators, a phase condition detector detects whether or not a reference phase is contained between two subsequent sampling points. A detection pulse generator is provided which generates a data detection pulse when the phase condition detector detects the reference phase.

6 Claims, 4 Drawing Sheets

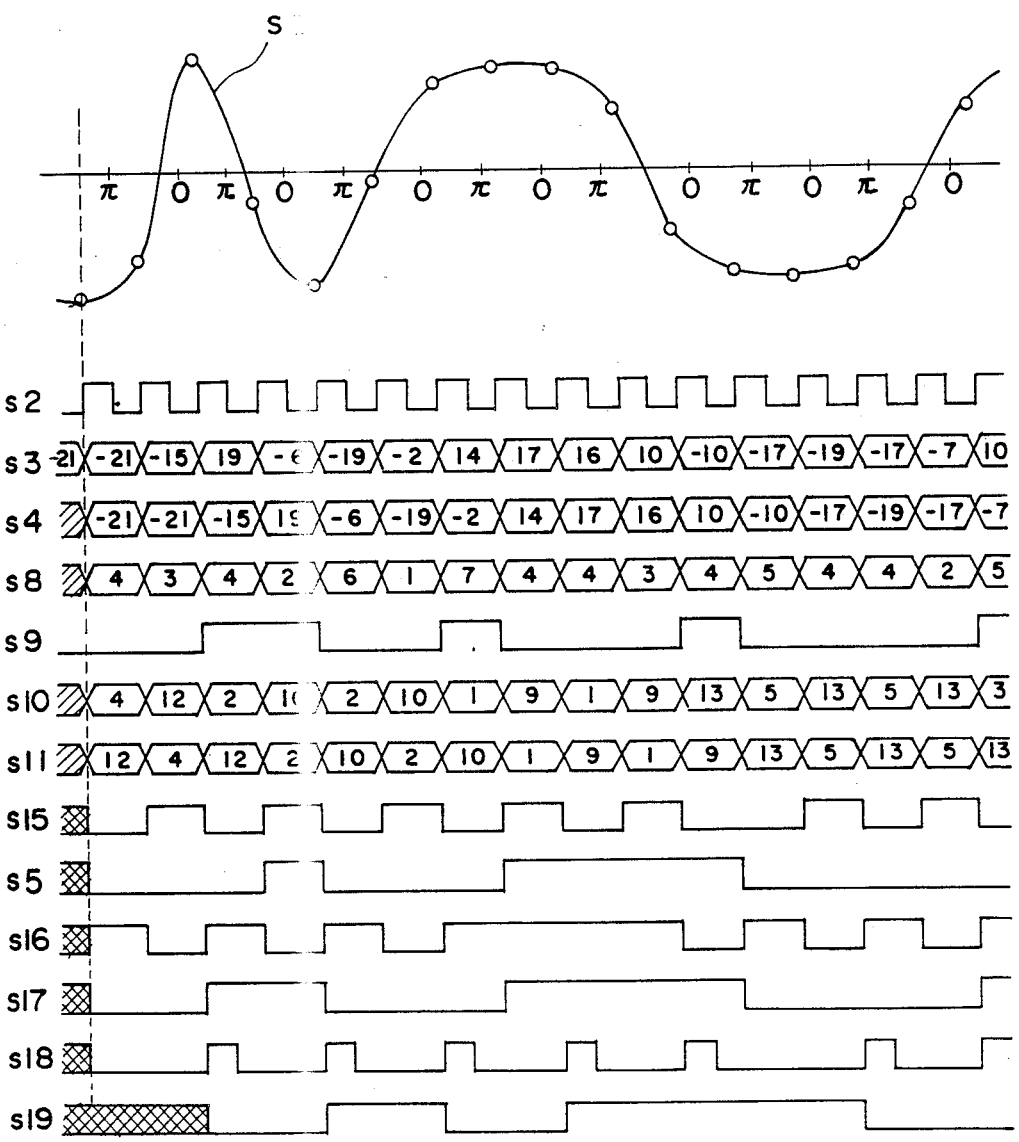

APPARATUS FOR RECORDING AND REPRODUCING DIGITAL SIGNALS ON MAGNETIC TAPE

BACKGROUND OF THE INVENTION

1. Field of the Invention

The present invention relates to an apparatus for recording and reproducing digital signals on a magnetic tape and, more particularly, to an improvement thereof which can properly record and reproduce digital signals even when wow and flutter are present.

2. Description of the Prior Art

Recording and reproducing apparatus in digital form, known as a digital tape recorder, has been proposed in various systems and, one of which is disclosed in Japanese Patent Publication (unexamined) No. 92410/1984 issued May 28, 1984 (a counterpart U.S. Patent application is issued as U.S. Pat. No. 4,543,531 on Sep. 24, 1985, and a counterpart EPC application is published as A1 109837 on May 30, 1984).

According to this reference, an input data signal carrying digital information is sampled at a frequency which is M times higher than a channel bit rate. The sampled signals from two adjacent sampling points are used for calculating an interval from a zero cross-over point where the digital signal intersects a reference level to a sampling time. Then, using the calculated interval, a data detection pulse is generated for detecting the digital information in the data signal.

Also, according to this reference, a digital audio signal is pulse code modulated (PCM) into a k bit signal for being recorded on a magnetic tape having n tracks. The signals in each track are processed serially in a digital manner making it possible to share the hardware between the tracks, and at the same time, enabling the formation of circuits in the IC form.

The data signal is based on an eye pattern defined by the combination of sine and cosine waves having zero crossing points every after the channel bit rate T. Therefore, the obtained data signal, which is formed by connecting the selected upper half cycles and lower half cycles of the eye pattern, has zero crossing points at the phase "0". The digital information carried in the data signal is detected by data detection pulses which should be produced in a synchronized relationship with the phase "pi" of the data signal. It is to be noted that the phase "0" and phase "pi" are illustrated as an example. Thus, these phases can be opposite or any other phases can be used as long as they appear alternately and periodically. Accordingly, these phases are generally referred to as reference phases. To produce data detection pulses, the data signal is sampled twice between two subsequent "pi's" phases. However, since the sampling pulses are basically prepared separately from the data signal, the sampling pulses and the reproduced signal, although they have a related frequency as long as the tape runs at the rated speed, are not necessarily synchronized. In fact, they are not synchronized most of the time. Therefore, a suitable detecting means is necessary to detect the phase condition of the sampled data. Such a detecting means is disclosed in the above mentioned U.S. Pat. No. 4,543,531 or in EPC application publication No. A1 109837.

Also according to this apparatus, the data detection pulses for detecting the actual data signal are generated by using only one detecting means. For example, according to the above identified reference (U.S. Pat. No. 4,543,531), data detection signal ⌀4 is generated by a single detection step using only one comparator 26 shown therein. However, when tape flutter takes place caused by the speed change of the tape, jitter and wow can occur. In such a case, different conditions must be considered to generate the data detection pulses, otherwise the data detection pulses will be skipped or undesirably added, resulting in a high rate of error.

SUMMARY OF THE INVENTION

The present invention has been developed with a view to substantially overcome the above described disadvantages and has for its essential object the provision of an improved digital signal recording and reproducing apparatus which can record and reproduce the digital signal correctly even during the presence of jitter and wow.

It is also an essential object of the present invention to provide an improved digital signal recording and reproducing apparatus which can produce the data detection signals at every occurrence of a phase "pi" in the digital signal.

It is a further object of the present invention to provide an improved digital signal recording and reproducing apparatus which can detect the data as precisely as the original data even when jitter or wow are present.

In accomplishing these and other objects, apparatus for recording and reproducing data signals carrying digital information at each periodically appearing reference phase (pi) according to the present invention comprises: detector means for detecting and producing a phase data signal at each sampling point, first storing means for storing a first phase data signal at a first sampling point, and second storing means for storing a second phase data signal at a second sampling point which is immediately prior to the first sampling point. Three comparators are further included. The first comparator compares the first and second phase data signal. The second comparator compares the first phase data signal with a predetermined value, and the third comparator compares the second phase data signal with a predetermined value equal to the aforementioned predetermined value, ie. N/2. A phase condition detector is provided which, upon receipt of the outputs of the first, second and third comparators, detects whether or not a reference phase is contained between first and second sampling points. Furthermore, a detection pulse generator is provided for generating a data detection pulse when the phase condition detector detects reference phase.

The apparatus, according to the present invention, further comprises a zero cross-over detector for detecting a zero-crossing during a sampling period between the first and second sampling points. Also, the above-mentioned detection pulse generator generates a data detection pulse when the zero cross-over detector detects a zero-crossing in both of two subsequent sampling periods.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIG. 5 shows waveforms obtained at various points in the circuit of FIG. 1.

DESCRIPTION OF THE PREFERRED EMBODIMENT

In the embodiment described herein, the magnetization minimum inversion span, or the minimum length between transition, (Tmin) is selected, as an example, to be 0.8T (wherein T is a channel bit rate), and the magnetization maximum inversion span, or the maximum length between transition, (Tmax) is selected to be 3.2T. Also, the digital signal is modified by way of NRZ (Non-Return-to-Zero) encoding/decoding system.

Figures 1, 2:
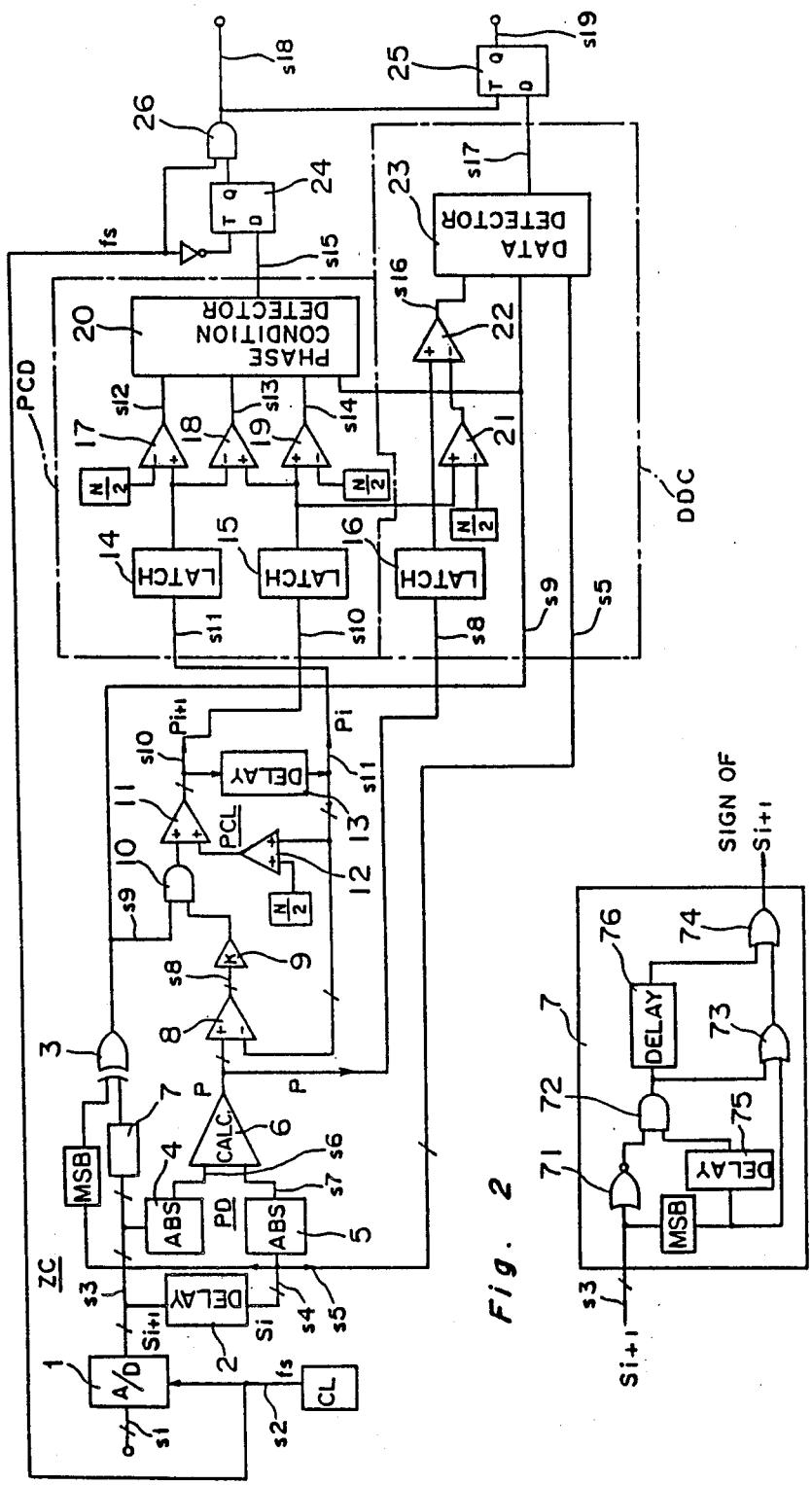
FIG. 1 is a circuit diagram of a digital signal recording and reproducing apparatus according to the preferred embodiment of the present invention.
FIG. 2 is a circuit diagram showing a detail of a zero data detector shown in FIG. 1.

Referring to FIG. 1, a digital signal recording and reproducing apparatus according to the preferred embodiment of the present invention is shown. The apparatus receives a data signal s1 (FIG. 5) carrying digital information at A/D (analog-to-digital) converter 1 and produces from flip-flop 25 a digital signal s19 (Fig. 5) which is detected by data detection pulses s18 (FIG. 5) produced from AND gate 26.

Data signal s1 is a signal produced from a read/write head (not shown) as the head passes the magnetisable surface of a recording medium, such as a magnetic tape.

The A/D converter 1 converts signal s1 to a K-bit digital signal s3 in response to a sampling pulse s2 generated by a pulse generator CL. The sampling pulse s2 has a frequency fs approximately equal to twice the frequency of the phase "pi" occurring in the data signal. The digital signal s3 is described by two's complement so that the MSB (most significant bit) "1" or "0" indicates, respectively, the sign (−) or (+) of the converted k-bit digital signal s3. The output of A/D converter 1 is connected to a parallel k-bit delay circuit 2 which produces a delayed signal s4 which is a one sampling period delayed signal. The present signal s3 is also connected to a zero data detector 7 which detects the MSB of the signal s3, and at the same time, it detects the sign for a zero. The sign of a zero should be defined as (+) when the zero is detected during the decrease of the data signal s1 from the positive domain, and is should be defined as (−) when the zero is detected during the increase of the data signal from the negative domain. The detail of the zero data detector 7 will be described below in connection with FIG. 2.

Referring now to FIG. 2, the zero data detector 7 includes a NOR gate 71 which receives the k-bit signal s3 and produces "1" when the k-bit signal contains only "0", and produces "0" when the k-bit signal contain at least one "1". The MSB of k-bit signal s3 is applied to a first delay circuit 75. The output of the delay circuit 75 is applied to an AND gate 72. AND gate 72 also receives the output from NOR gate 71. The output of AND gate 72 is applied to a second delay circuit 76 and also to an OR gate 73, which also receives the MSB of k-bit signal s3. The output of OR gate 73 and the output of delay 76 are applied to another OR gate 74.

First, a condition when the k-bit signal s3 changes from a positive number to zero will be described. When the k-bit signal s3 is a positive number, its data will be (0xx . . . x), wherein xxx represents any combination of digits "0" and "1" provided that at least one digit thereof is "1". In this instance, NOR gate 71 produces a "0", thereby producing "0" from AND gate 72 which is stored in delay 76. Also, since the MSB of k-bit signal s3 is "0", delay 75 delays the "0" and OR gate 73 produces a "0". Furthermore, OR gate 74 produces "0" as a sign signal for k-bit signal s3 indicating that k-bit signal s3 is a positive number. Then, when the k-bit signal s3 is changed to zero (000 . . . 0), NOR gate 71 produces "1" and delay 75 produces "0" which has been stored in the previous cycle. Thus, AND gate 72 produces "0". Also, since the MSB of k-bit signal s3 is "0", OR gate 73 produces "0" and OR gate 74 produces "0", thereby indicating that the number zero (000 . . . 0) in this case is a positive number.

Figure 3:
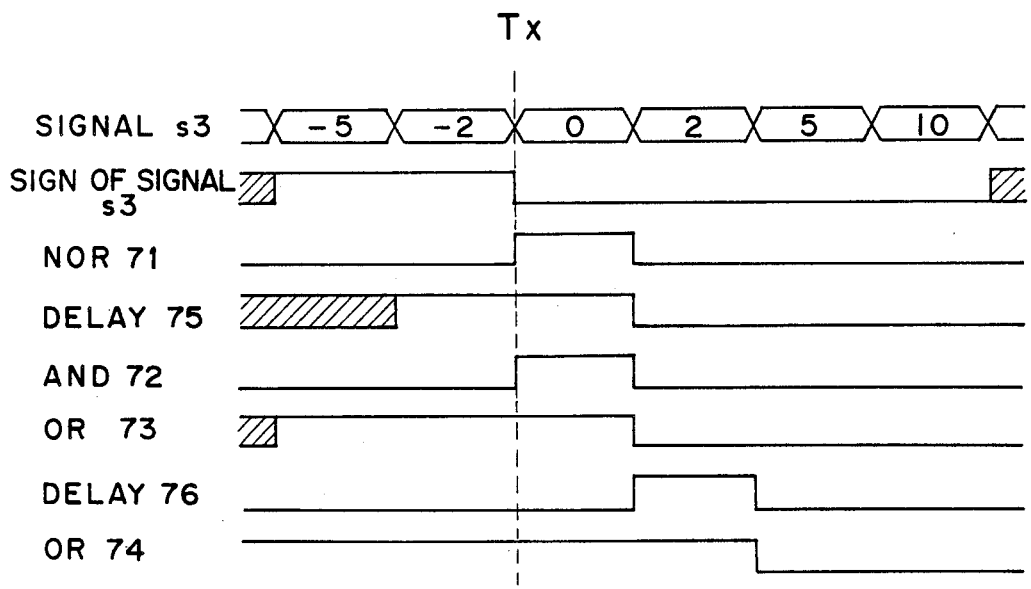
FIG. 3 is illustrative of waveforms obtained at various points in the circuit of FIG. 2.

Next, a situation when the k-bit signal s3 changes from a negative number to zero will be described. When the k-bit signal s3 is a negative number, its data will be (1xx . . . x), wherein xxx represents any combination of digits "0" and "1" provided that at least one digit thereof is "1". In this instance, NOR gate 71 produces a "0", thereby producing "0" from AND gate 72 which is stored in delay 76. Also, since the MSB of k-bit signal s3 is "1", delay 75 carries "1" and OR gate 73 produces a "1". Furthermore, OR gate 74 produces "1" as a sign signal for k-bit signal s3 indicating that k-bit signal s3 is a negative number. Then, when the k-bit signal s3 is changed to zero (000 . . . 0), NOR gate 71 produces "1" and delay 75 produces a "1" which has been stored in the previous cycle. Thus, AND gate 72 produces a "1". Thus, OR gate 73 produces "1" and OR gate 74 produces "1", thereby indicating that the number zero (000 . . . 0) in this case is a negative number. The signal change in zero data detector 7 for the latter case is shown in FIG. 3, in which it is indicated that k-bit signal s3 changes from a negative value (−2) to zero at time Tx.

The MSB of the present signal s3, as generated by zero data detector 7, and the MSB of the delayed signal s4 are both applied to an exclusive-OR gate 3, so that gate 3 produces a binary "high" level signal when the applied MSBs have a different sign, indicating that the data signal s1 has crossed the zero level between the present and one previous sampling point. At other times, the exclusive-OR gate 3 produces a binary "low" level signal. Accordingly, the above described circuits 1, 2, 3 and 7 define a zero-crossing detector ZC.

The present signal s3 and the delayed signal s4 are also applied, respectively, to absolute value circuits 4 and 5 at which absolute values $|S_{i+1}|$ and $|S_i|$ of the sampled signals are obtained, respectively, wherein $S_{i+1}$ and $S_i$ represent amplitudes of signal s1 at two subsequent sampling points as sampled by sampling pulse s2. Then, at a calculator circuit 6, the phase difference P between the zero-crossing point and the sampling point $S_{i+1}$ is calculated acording to the following equation;

$$P=[|S_{i+1}|/(|S_{i+1}|+|S_i|)]\times(N/2)$$

in which N represents the number of equally divided sections between two adjacent two sampling points. In the example described herein, N equals 16. Although this calculation is carried out after every sampling interval the calculated phase difference P will be used in a phase data circulation loop PCL (described later) only when the zero crossing point is detected between the sampling points $S_{i+1}$ and $S_i$. The above described circuits 2, 4, 5 and 6 define a reference phase detector PD.

The obtained phase difference P is applied to comparator 8 where the phase difference P is compared with an output signal s11 of the phase data circulation loop PCL fundamentally defined by AND gate 10, adder 11 and a parallel m-bit delay circuit 13. A signal s8 outputted from comparator 8, representing the difference $P-P_i$, is applied to a multiplier 9 where the difference $P-P_i$ is multiplied by a predetermined constant 5 K (0<K<1). The constant K corresponds to the loop gain, so that the difference $P-P_i$ is compensated in multiplier 9. When no zero-crossing point is detected, the phase data circulates in the phase data circulation loop PCL through adder 11, delay 13 and adder 12. However, when the zero-crossing point is detected, an AND gate 10 connected to exclusive-OR gate 3 is enabled to permit the transmission of the compensated difference $P-P_i$ to adder 10. Thus the circulation data is added with the compensated difference $P-P_i$ at adder 10.

The structure so far described, as well as the operation thereof, is fundamentally the same as that disclosed in the above mentioned reference, U.S. Pat. No. 4,543,531 or in EPC application publication No. A1 109837. Therefore, a further description therefor is omitted.

According to the present invention, output signals from adder 11 and delay circuit 13 are used in a phase condition detection circuit PCD for detecting different conditions and generating the data detection pulses s18 (FIG. 5).

Referring again to FIG. 1, the phase condition detection circuit PCD comprises latches 14 and 15, comparators 17, 18 and 19 and phase condition detector 20, which are driven by sampling pulses sCL from pulse generator 2. The signal s10 representing the phase $P_{i+1}$ is transmitted from adder 11 to latch 15. Similarly, signal s11 representing the phase $P_i$ is transmitted from delay circuit 13 to latch 14. The latched data $P_i$ and $P_{i+1}$ are applied to comparators 17, 18 and 19. In comparator 17, data $P_i$ is compared with a predetermined value N/2; in comparator 18, data $P_i$ is compared with data $P_{i+1}$; and in comparator 19, data $P_{i+1}$ is also compared with the same predetermined value N/2. The outputs from comparators 17, 18 and 19 are applied to phase condition detector 20, which also receives the output signal from exclusive OR gate 3.

Phase condition detector 20 detects whether a data detection pulse should be generated, or not. Phase condition detector 20 detects that a data detection pulse should be generated when a phase "pi" is present between the phases $P_i$ and $P_{i+1}$, as stored in latches 14 and 15, or when the zero-crossing point is detected successively for the second time, i.e., when exclusive OR gate 3 produces an output of "1" twice in a row. In FIGS. 4a–4d, all the possible conditions are shown in which the phase "pi" is present between phases $P_i$ and $P_{i+1}$. In FIGS. 4e–4g, all the possible conditions are shown in which no phase "pi" is present between the same. In the drawings, the data signal is shown as having a zero-crossing point between phases $P_i$ and $P_{i+1}$, but the phase condition detection circuit PCD operates in the same manner when no zero-crossing point is present between phases $P_i$ and $P_{i+1}$, that is, when the data dignal is in the positive domain or in the negative domain.

Different conditions shown in FIGS. 4a–4g are produced not only when the tape runs at the rated speed, but also when the tape is running speed off the rated speed, or when the tape is expanded or contracted. For example, the particular condition shown in FIG. 4e may take place when the tape is undesirably expanded, and the conditions shown in FIGS. 4f–4g may take place when the tape is undesirably contracted.

Figure 4A:
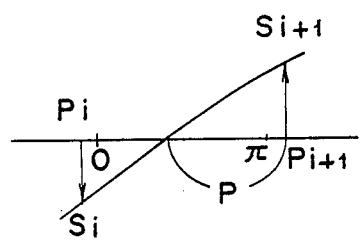
FIGS. 4a to 4g are graphs showing different conditions of the data signal due to the change of the phase of the sampling points and also to the change of tape speed.

To detect the condition shown in FIG. 4a, the following formula I should be satisfied.

$$P_i > P_{i+1}, P_i \geq N/2, \text{ and } P_{i+1} \geq N/2 \quad (I)$$

Figure 4B:
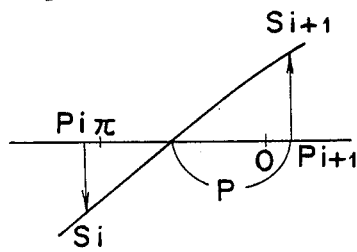

To detect the condition shown in FIG. 4b, the following formula II should be satisfied.

$$P_i > P_{i+1}, P_i < N/2, \text{ and } P_{i+1} < N/2 \quad (II)$$

Figure 4C:
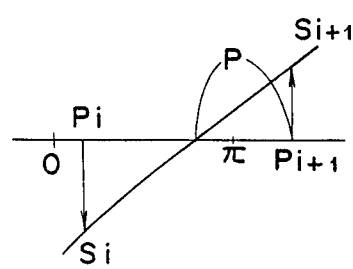
Figure 4D:
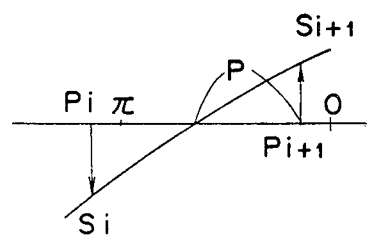
Figure 4E:
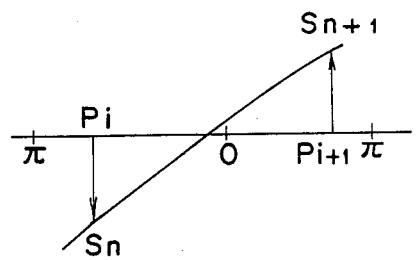
Figure 4F:
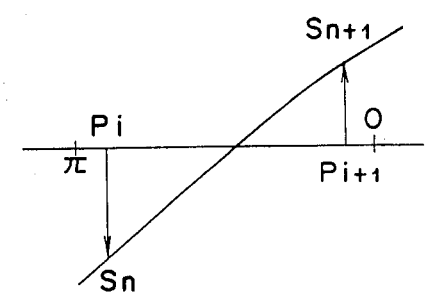
Figure 4G:
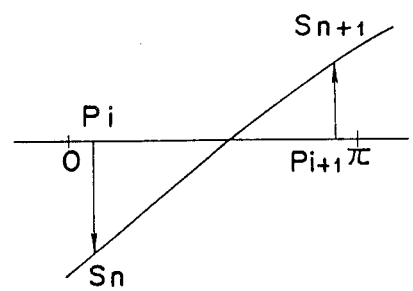

To detect the condition shown in FIG. 4c or 4d, the following formula III should be satisfied.

$$P_i < P_{i+1}, P_i < N/2, \text{ and } P_{i+1} \geq N/2 \quad (III)$$

When any one of the above formulae (I), (II) and (III) condition is detected, or when a "1" from exclusive OR gate 3 is detected twice in a row, phase condition detector 20 produces a signal s15 (FIG. 5) which is coupled to flip-flop 24 in each sampling cycle. When none of the above formulae (I), (II) and (III) conditions are detected and no successive "1s" from exclusive OR gate 3 are detected, phase condition detector 20 stops producing a pulse in signal s15. Phase condition detector 20 also receives samplings pulses s2 from pulse generator CL. Thus, in response to signal s15, AND gate 26 permits the sampling pulses to pass therethrough. The pulses fed from AND gate 26 are referred to as data detection pulses s18 are which are used in flip-flop 25 for reading the digital information carried in data signal s1.

Next, detection is carried out in a data detection circuit DDC in response to each data detection pulse and will now be described.

The data detection circuit DDC comprises a latch 16, a subtractor 21, a comparator 22, and a data detector 23 which is driven by sampling pulses s2 from pulse generator 2. Latch 16 stores a signal P representing the phase difference between the zero-crossing point and the sampling point $S_{i+1}$, as obtained from calculator circuit 6. Subtractor 21 subtracts the predetermined value N/2 from the phase data $P_{i+1}$, as obtained from latch 15. Comparator 15 compares the phase data $P_{i+1} - N/2$ with the phase difference P, and the compared result is applied to data detector 23. Data detector 23 also receives signal s9 from exclusive OR gate 3, and signal s5 (sampled signal Si) from delay circuit 2.

The data detector 23 detects digital information carried in the data signal s1 in the following manner. When sampled data $S_i$ and sampled data $S_{i+1}$ have the same sign, the digital information to be detected in response to the data detection pulse is determined by the sign of sampled data signal $S_i$, or that of sampled data signal $S_{i+1}$. For example, when both sampled data signals $S_i$ and $S_{i+1}$ have the sign (+), "0" is generated and fed from data detector 23 as the digital output. On the contrary, when both sampled data signals $S_i$ and $S_{i+1}$ have the sign (−), "1" is coupled from detector 23 as the digital output. The signal generated by the detector 23 is temporarily held in flip-flop 25 and is read out in response to a data detection pulse being received from AND gate 26.

When the sampled data signals $S_i$ and $S_{i+1}$ have different signs, the digital information to be detected in response to the data detection pulse is determined such that: (a) if the phase "pi" is located between the zero-crossing point and sampling point $S_i$, such a digital information is determined by the sign of the sampled data signal $S_i$; and (b) if the phase "pi" is located between the zero-cross point and sampling points $S_{i+1}$, such a digital information is determined by the sign of the sampled data signal $S_{i+1}$. When this type of detection is employed, the digital information at the phase "pi" can be detected.

The above mentioned two conditions (a) and (b) are detected in the following manner.

When data detector 23 detects "1" form exclusive OR gate 3 and, at the same time, a formula (IV)

$$P < P_{i+1} - N/2 \tag{IV}$$

is satisfied, it indicates that the phase "pi" is located between sampling point $S_i$ and the zero-crossing point, such as in the case shown in FIG. 4b or 4d. In this case, comparator 22 produces "0" so as to make data detector 23 to select the sign of the sampled signal $S_i$.

On the other hand, when data detector 23 detects "1" from exclusive OR gate 3 and, at the same time, a fromula (V)

$$P > P_{i+1} - N/2 \tag{V}$$

is satisfied, it indicates that the phase "pi" is located between sampling point $S_{i+1}$ and the zero-crossing point, such as in the case shown in FIG. 4a or 4c. In this case, comparator 22 produces "1" so as to make data detector 23 select the sign of the sampled signal $S_{i+1}$, which is opposite to the sign of the sampled signal $Si$.

The above embodiment is described in connection with a single track recording/reproducing apparatus. An N-track recording/reproducing apparatus (N is a positive integer) may be realized, e.g., by the parallel connection of N delay circuits 2, and also the parallel connection of N delay circuits 13.

In the above described embodiment, instead of using the system of NRZ with Tmin=0.8T and Tmax=3.2T, when desired other systems can be used. For example, a NRZI type system may be used.

As apparent from the foregoing description, according to the present invention, the phase condition detection circuit PCD and the data detection circuit DDC are provided so that the digital information can be detected corresponding to each phase "pi" in the data signal even when the tape speed is not constant. Thus, the detected signal obtained in response to the data detection pulse has no or less effect of the wow, flutter or jitter.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. An apparatus for recording and reproducing a digital data signal carrying digital information, comprising:
   detecting means for detecting and producing a phase data signal at a sampled point of said digital data signal;
   first storing means for storing a first phase data signal at a first sampling point;
   second storing means for storing a second phase data signal at a second sampling point which is immediately before said first sampling point;
   first comparator means for comparing said first phase data signal and said second phase data signal;
   second comparator means for comparing said first phase data signal with a first predetermined value;
   third comparator means for comparing said second phase data signal with a second predetermined value;
   phase condition detecting means responsive to the outputs of said first, second and third comparators for detecting whether or not a reference phase is contained between said first and second sampling points; and
   data detection pulse generating means for generating a data detection pulse when said phase condition detecting means detects said reference phase between said first and second sampling points.

2. An apparatus as claimed in claim 1 and further comprising zero-crossing detecting means for detecting a zero-crossing during a sampling period between said first and second sampling points, and wherein said data detection pulse generating means generates said data detection pulse when said zero-crossing detecting means detects a zero-crossing in both of two subsequent sampling periods.

3. An apparatus as claimed in claim 2, and further comprising:
   means for producing a phase difference representing a difference between a zero-crossing point and the next sampling point;
   third storing means for storing said phase difference;
   subtract or means for obtaining a phase difference between said first phase data and a third predetermined value;
   fourth comparing means for comparing the output of said subtract r with the output of said phase difference producing means; and
   data detecting means for detecting a digital information carried in said data signal based on the output of said fourth comparing means.

4. An apparatus as claimed in claim 3 and wherein said first, second and third predetermined value comprises equal values.

5. An apparatus as claimed in claim 1, further comprising means for detecting the sign of zero data such that the zero data is detected as having a sign of plus (+) when said zero data is detected during the decrease of said data signal, and as having a sign of minus (−) when said zero data is detected during the increase thereof.

6. An apparatus as claimed in claim 1 and wherein said first and second predetermined value comprises equal values.

* * * * *